United States Patent [19]

Kimura

[11] Patent Number: 4,779,513

[45] Date of Patent: Oct. 25, 1988

[54] PNEUMATIC CYLINDER WITH ROD BRAKING AND DECELERATING MECHANISM

[75] Inventor: Takashi Kimura, Nagoya, Japan

[73] Assignee: Nippon Joucomatic Co., Ltd., Tokyo, Japan

[21] Appl. No.: 711,849

[22] Filed: Mar. 14, 1985

[30] Foreign Application Priority Data

Jun. 11, 1984 [JP] Japan ............................... 59-120245

[51] Int. Cl.[4] ........................ F01B 31/12; F15B 15/26; B65H 59/10; F16D 65/24

[52] U.S. Cl. ............................................ 92/5 L; 92/10; 92/24; 92/85 B; 91/43; 188/67; 188/170

[58] Field of Search .................... 92/23, 24, 5 R, 13.4, 92/27, 28, 10, 11, 5 L, 85 B; 91/43, 350, 363, 42, 1; 188/67, 170; 74/531

[56] References Cited

U.S. PATENT DOCUMENTS

| | | | |
|---|---|---|---|
| 799,531 | 9/1905 | Bryant | 92/5 R |
| 1,122,111 | 12/1914 | Hanson | 92/5 R |
| 1,137,455 | 4/1915 | Bowser | 92/5 R |
| 1,683,175 | 9/1928 | Falcke et al. | 92/24 X |
| 2,821,172 | 1/1958 | Randall | 91/43 X |
| 3,095,785 | 7/1963 | Cahill | 92/5 R X |
| 3,106,084 | 10/1963 | Hoffman et al. | 91/363 R X |
| 3,541,925 | 11/1970 | Guinot | 92/5 R X |
| 3,575,087 | 4/1971 | Sherwood | 92/23 |
| 3,665,812 | 5/1972 | Hashimoto et al. | 92/24 |
| 3,691,902 | 9/1972 | Lebzelter | 92/5 R X |
| 4,106,390 | 8/1978 | Kodaira et al. | 91/43 X |
| 4,222,462 | 9/1980 | Ottestad | 188/67 |
| 4,378,726 | 4/1983 | Stoll | 92/5 R X |
| 4,419,924 | 12/1983 | Peter et al. | 188/67 X |
| 4,534,269 | 8/1985 | Scerbo et al. | |
| 4,564,088 | 1/1986 | Takahashi et al. | 188/67 |
| 4,619,188 | 10/1986 | Kimura | 92/27 X |

FOREIGN PATENT DOCUMENTS

| | | | |
|---|---|---|---|
| 2314111 | 9/1973 | Fed. Rep. of Germany | 92/10 |
| 3239118 | 4/1984 | Fed. Rep. of Germany | 91/43 |
| 54-138966 | 10/1979 | Japan | 92/5 R |
| 57-43762 | 9/1982 | Japan . | |
| 58-108604 | 7/1983 | Japan . | |
| 630147 | 5/1982 | Switzerland | 92/5 R |

*Primary Examiner*—Abraham Hershkovitz
*Assistant Examiner*—George Kapsalas
*Attorney, Agent, or Firm*—Kenyon & Kenyon

[57] ABSTRACT

A pneumatic cylinder device having a decleration mechanism. The pneumatic cylinder device has a pneumatic cylinder including a cylinder accomodating a piston movable in the cylinder in response to supply and discharge of compressed air and having a connected piston rod. The pneumatic cylinder further includes a position detector such as a combination of proximity switches and a magnet carried by the piston designed for producing a deceleration signal and a stopping signal when the piston rod has reached a predetermined deceleration starting position and a designated stopping position, respectively. A brake which is connected to the pneumatic cylinder is adapted for stopping the movement of the piston rod in response to the stopping signal produced by the position detector. The pneumatic cylinder device further comprises a deceleration stage connected to the brake and adapted for decelerating the piston rod in response to the deceleration signal produced by the position detector.

8 Claims, 6 Drawing Sheets

PNEUMATIC CYLINDER WITH ROD BRAKING AND DECELERATING MECHANISM

BACKGROUND OF THE INVENTION

1. Field of the Invention

The present invention broadly relates to a pneumatic cylinder device and, more particularly, to a pneumatic cylinder device having a decelerating mechanism which retards the piston of the cylinder device during the stroking down to a desired low speed such as to allow the piston to stop at a designated position, thus attaining a high precision of the stopping position control.

2. Description of the Prior Art

Japanese Utility Model Laid-Open No. 108604 discloses a pneumatic cylinder device with a fluid-pressure type braking system capable of stopping the piston at a desired position by making use of a control means such as a three-way valve. More specifically, this pneumatic cylinder device has a ram which is urged by a spring such as to displace a fluid from a booster chamber. The pressure of the displaced fluid is applied through a hydraulic chamber to the outer peripheral surface of a slitted bush on the piston, such as to radially contract the bush thereby braking and stopping the piston rod.

On the other hand, Japanese Patent Publication No. 43762/1982 discloses a pneumatic cylinder device with a mechanical-type locking mechanism. This pneumatic cylinder device has a lock cylinder connected to the pneumatic cylinder and receiving a lock piston urged by a spring. The lock piston includes a fastening member having a wedging function and adapted to press a plurality of balls which in turn press a lock shoe receiving the piston rod, thus braking and locking the piston rod.

When these pneumatic cylinder devices with a piston rod stopping function are used for driving various machines, it is necessary to employ many controlling parts or elements such as solenoid valves, control circuit, and a sensor for detecting the position of the piston rod.

Unfortunately, however, the conventional control systems have not been able to provide sufficiently high precision of stopping position control for the following reasons. For instance, the precision of the stopping position control is impaired by the fluctuation in the response characteristics of the solenoid valves. When a microcomputer is used as the control circuit, the time duration from the moment at which a signal is input from the piston rod position sensor till the moment at which the microcomputer actually delivers the driving signal varies depending on the timing of scanning performed in the microcomputer. In addition, the speed of the piston rod varies momentarily causing a difference in the response to the control.

In order to achieve a higher precision of the stopping position control, it has been proposed that a so-called feedback control be adopted in which a comparison is made between the actual stopping postion of the piston rod and the command stopping position and the control is made to nullify the difference. This feedback control is generally expensive and inherently unstable in operation.

SUMMARY OF THE INVENTION

Accordingly, an object of the invention is to provide a simple and inexpensive pneumatic cylinder device with a decelerating mechanism which is capable of stopping the piston rod at the designated position with high accuracy.

To this end, according to the invention, there is provided a pneumatic cylinder device having a deceleration mechanism comprising: a pneumatic cylinder including a cylinder accomodating a piston movable in the cylinder in response to supply and discharge of compressed air and having a piston rod connected thereto, the pneumatic cylinder further including position detecting means adapted to produce a deceleration signal and a stopping signal when the piston rod has reached a predetermined deceleration starting position and a designated stopping position, respectively; a braking means connected to the pneumatic cylinder and adapted to stop the movement of the piston rod in response to the stopping signal produced by the position detecting means; and a deceleration means connected to the braking means and adapted to decelerate the piston rod in response to the deceleration signal produced by the position detecting means.

With this arrangement, the piston rod is braked after a sufficient degree of deceleration has taken place, so that the precision of the stopping position control is enhanced remarkably.

The pneumatic cylinder device of the invention preferably has an adjusting means for adjusting the rate of deceleration of the piston rod during its deceleration by the deceleration braking means.

The above and other objects, features and advantages of the invention will become clear from the following description when the same is read in conjunction with the accompanying drawings.

DESCRIPTION OF THE PREFERRED EMBODIMENT

Figure 1:
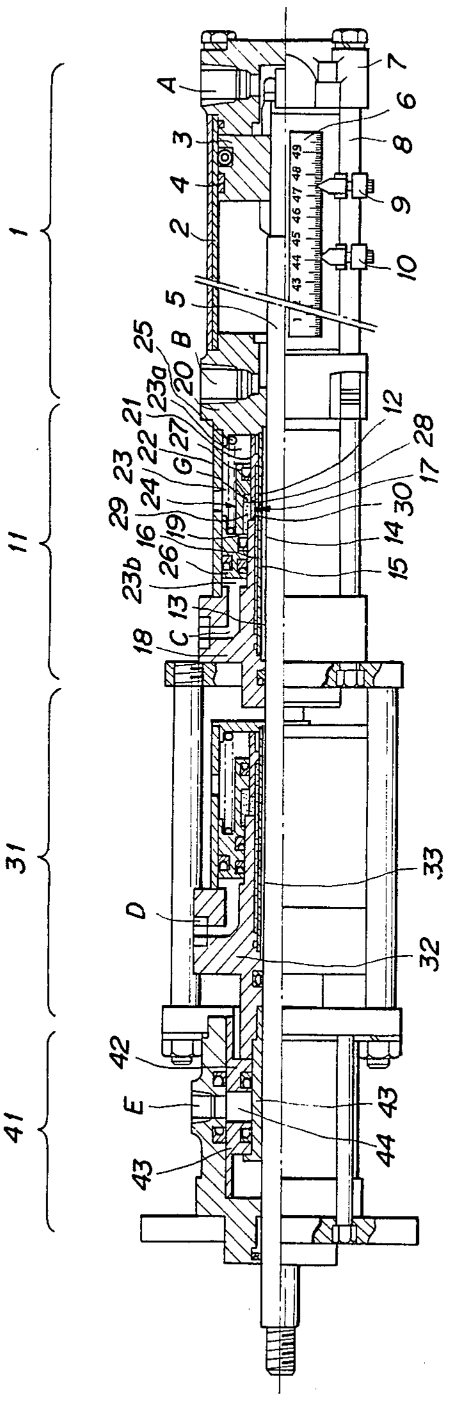
FIG. 1 is a side elevational view of an embodiment of the invention with its upper half part being shown as a section taken along the longitudinal axis.
Figure 1A:
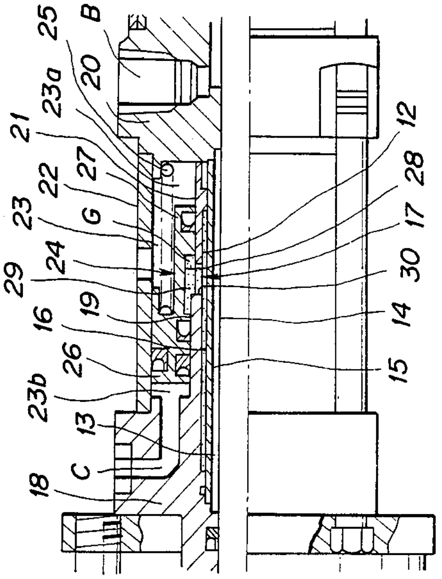
FIG. 1A is an enlarged view of a part of FIG. 1.

Referring to FIG. 1, an embodiment of the pneumatic cylinder device with deceleration mechanism in accordance with the invention has a pneumatic cylinder 1 composed of a cylinder tube 2 made of a non-magnetic material such as aluminum. The cylinder tube 2 receives a piston 3 for sliding movement therein. The piston 3 is provided with a rubber magnet 4 fitting in an annular groove formed in the outer peripheral surface thereof. The piston 3 is adapted to slide in the cylinder tube 2 as compressed air is charged into and discharged from a port A or B, such as to axially drive a piston rod 5 formed integrally with the piston 3. A scale plate 6 having a scale indicative of the travel of the piston rod 5 is provided on the outer peripheral surface of the cylinder tube 2. A head cover 7 is secured to one end of the cylinder tube 2 by means of tie rods 8. One of the tie rods 8 carries at suitable portions thereof a pair of magnetic proximity switches 9,10 such as lead switches. These lead switches 9 and 10 are adapted to produce contact signals upon detecting the magnetism of the rubber magnet 4 when approached by the piston 3. For instance, the lead switch 9 is used for producing the signal representing the timing at which the deceleration of the piston rod 5 is to be commenced, while, the other lead switch 10 is used for the purpose of stopping the piston rod 5.

A braking means or piston rod braking section 11 is connected to one end of the pneumatic cylinder 1.

The braking section 11 has an internal bore 12 which accommodates a brake metal 14 and a flexible thin-walled bush 15. The brake metal 14 has a slit 13 and slidably receives the piston rod 5, while the bush 15 fits around the brake metal 14. A first pressure chamber 16 is formed between the outer peripheral surface of the flexible thin-walled bush 15 and the wall of the bore 12. A sleeve 17 integrally formed with a piston rod brake cover 18 and provided in the braking section 11 has a stepped outer peripheral surface constituted by a large-diameter portion 19 adjacent to the piston rod brake cover 18 and a small-diameter portion 21 adjacent to a rod cover 20. A boosting tube 22 made of aluminum is disposed between the piston rod brake cover 18 and the rod cover 20, so that a piston chamber 23 is formed around the sleeve 17. The piston chamber 23 receives a booster piston 24 which divides the space in the piston chamber into a spring chamber 23*a* and a brake releasing chamber 23*b*. The spring chamber 23*a* accommodates a spring 25 which urges the booster piston 24 towards the brake releasing chamber 23*b*. The booster piston has a large piston 26 and a small piston 27 which are made integral with each other. The large piston 26 slides along the large-diameter portion 19 of the sleeve 17, while the small piston 27 slides along the small-diameter portion of the same. A recess 28 having a predetermined width is formed in the booster piston 24 such as to extend over the large- and small-diameter portions 19 and 21 of the sleeve 17, so that a second pressure chamber 29 is formed between the sleeve 17 and the booster piston 24. The second pressure chamber 29 is communicated with the first pressure chamber 16 through a communication hole 30 formed in the sleeve 17 such as to extend normally to the outer periphery of the small-diameter portion 21 of the sleeve 17 in the vicinity of the step. A brake releasing port C which communicates with the brake releasing chamber 23*b* is formed in a portion of the piston rod brake cover 18. Assuming here that the brake releasing port C is opened for free discharge of air, the booster piston 24 is moved by the spring 25 to compress a gel-like rubber G filling the second pressure chamber 29 thus generating a pressure in the latter. This pressure is then transmitted through the communication hole 30 to the gel-like rubber G in the first pressure chamber 16 so that the brake metal 14 is pressed radially inwardly through the flexible thin-walled bush 15. As a result, the brake metal 14 is contracted radially while reducing the width of the slit 13 such as to embrace the piston rod 5 thus holding the piston rod 5 by friction.

A decelerating means or deceleration braking section 31 is connected to the piston rod braking section 11. The deceleration braking section 31 has a construction substantially identical to that of the piston rod braking section 11. This section 31 has a deceleration brake cover 32 in which is formed a brake releasing port D. When the brake releasing port D is opened for free discharge of air, a brake metal 33 embraces and holds the piston rod 5 so that the deceleration brake cover 32 is movable together with the piston rod 5. The deceleration brake cover 32 is formed integrally with a flow control piston rod 34 received in a deceleration rate adjusting section 41 which will be explained hereinunder.

The deceleration rate adjusting section 41 connected to the deceleration braking section 31 includes a flow control piston 42 adapted to be pressed and made to slide by the deceleration brake cover 32 and a flow rate control piston 43 which is designed to be pressed and made to slide by the flow rate control piston rod 34. A fluid chamber 44 formed between the flow rate control pistons 42 and 43 changes its volume depending on the positions of these pistons 42 and 43. The fluid chamber 44 communicates with a port E.

The operation of this embodiment will be described hereinunder with reference to FIGS. 2 to 5.

Figure 2:
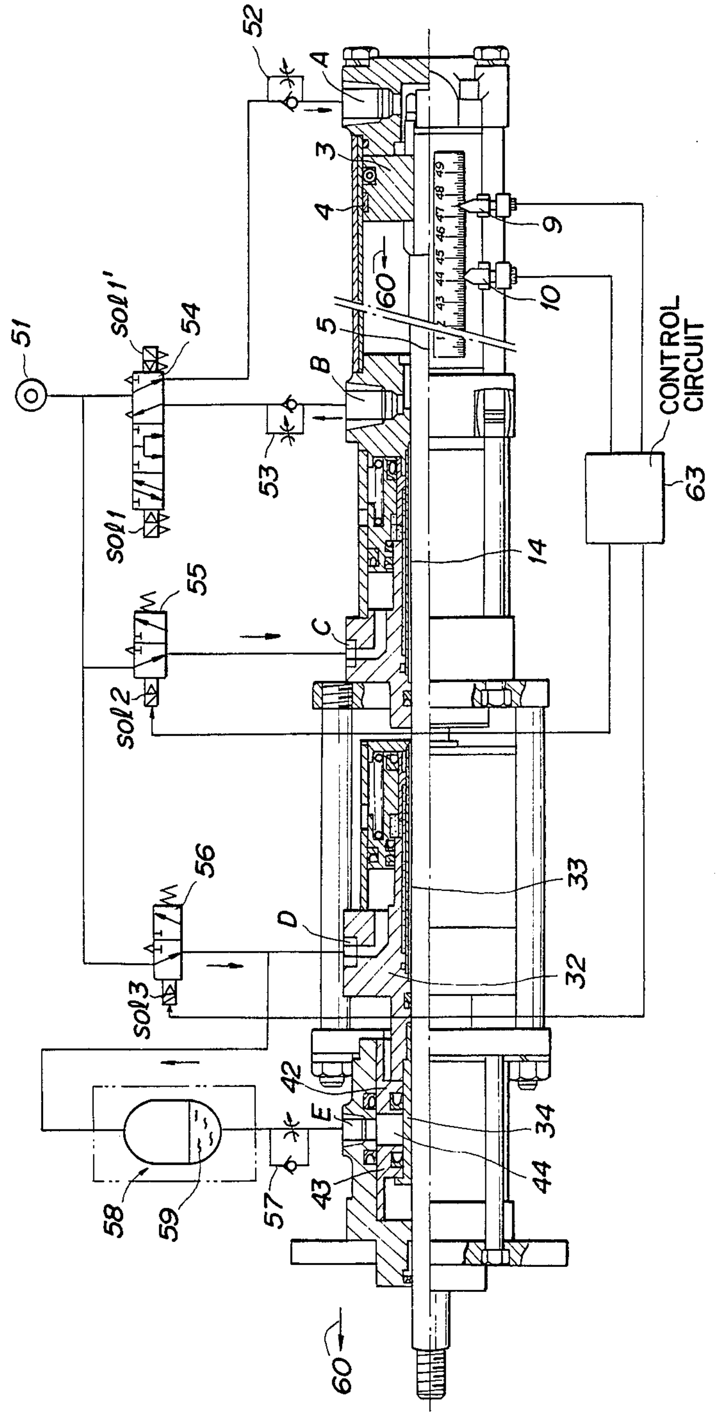
FIGS. 2 to 5 are illustrations of the embodiment shown in FIG. 1 in different states of operation.

As will be seen from FIG. 2, either the port A or B is supplied with compressed air from an external compressed air source 51 through a five-way valve 54 past a speed control valve 52 or 53. The port C is communicable either with the compressed air source 51 or the atmosphere through a three-way valve 55, while the port D is selectively communicated with the compressed air source 51 and the atmosphere through a three-way valve 56.

The port E is connected to port D and the three-way valve 56 through a flow control valve 57 and a hydro-converter 58. The fluid chamber 44, flow control valve 57 and the hydro-converter 58 are filled with an incompressible fluid 59.

A control circuit 63 controls, upon receipt of signals from the lead switches 9 and 10, the positions of the five-way valve 54 and three-way valves 55,56, thus allowing the ports A,B,C and D to suitably supply and discharge the air. The control circuit 63 may be composed of, for example, a sequencer.

Figure 3:
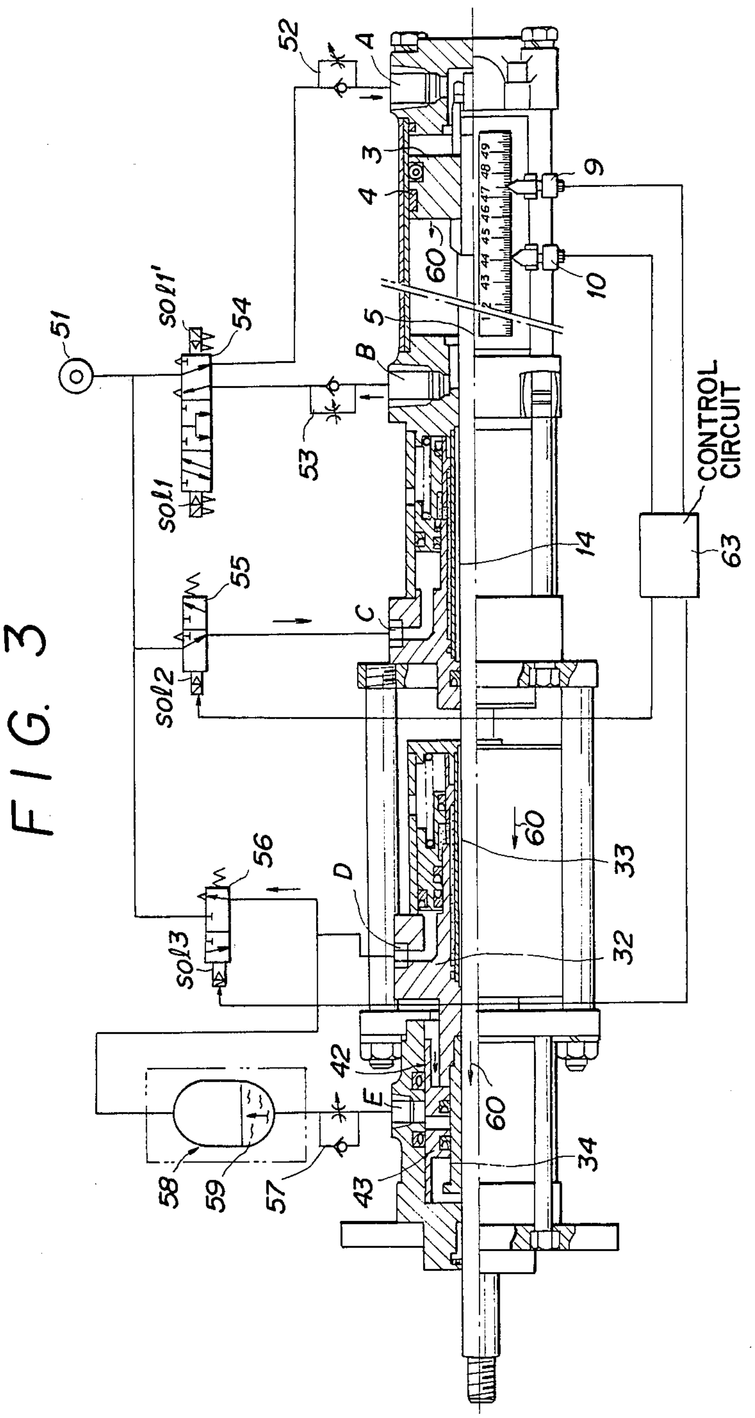
Figure 4:
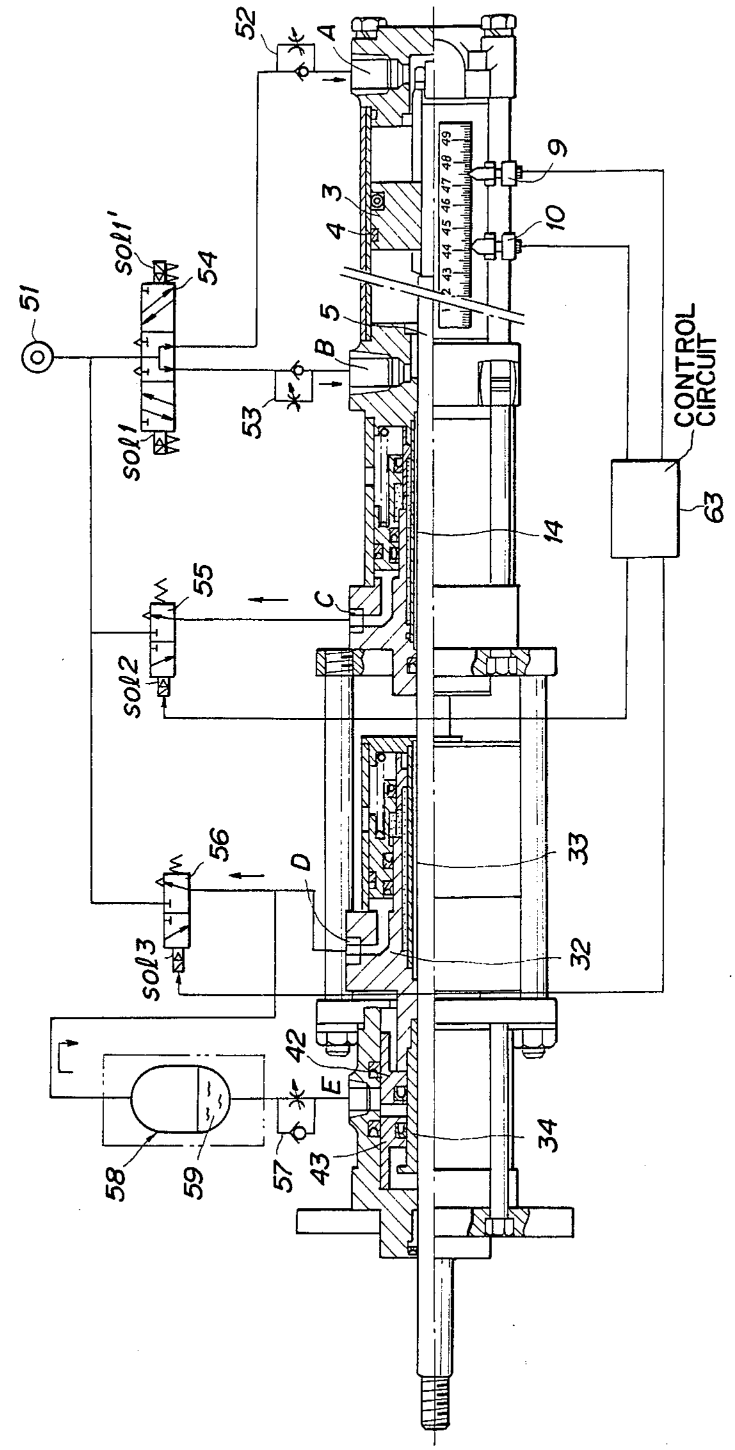

Referring to FIG. 2, the solenoid valves Sol 1 and Sol 1' of the five-way valve 54 are controlled to allow the ports A and B to supply and discharge the air, respectively. At the same time, the three-way valves 55 and 56 are controlled to allow the ports C and D to supply the air. In this state, the piston 3 and hence the piston rod 5 are moved in the direction of the arrow 60. When the magnetism of the rubber magnet 4 on the periphery of the piston 3 is detected by the lead switch 9, the control circuit 63 controls the solenoid Sol 3 of the three-way valve 56, thus allowing the port D to discharge air as shown in FIG. 3. As a result, the deceleration brake metal 33 of the deceleration braking section 31 grips the piston rod 5, so that the deceleration brake cover 32 starts to move together with the piston rod 5. The end of the deceleration brake cover 32 pushes the flow control piston 42 forwardly, such as to reduce the volume in the fluid chamber 44 thus displacing the fluid 59 from the fluid chamber 44 through the port E. By employing a suitable means for changing the area of the passage for the fluid 59 in the flow control valve 57, it is possible to change the flow rate of the fluid flowing into the hydro-converter 58 from the port E, thus allowing the adjustment of the forward stroking speed of the flow rate control piston 42, deceleration brake cover 32 and the piston rod 5.

Thus, the approach of the rubber magnet 4 and, hence, of the piston 3 carrying the magnet 4 is sensed by the lead switch 9 which is provided at a suitable deceleration starting position along the path of the piston rod 5. The lead switch 9 then produces a signal for controlling the solenoid valve Sol 3 of the three-way valve 56, such as to allow the port D to discharge the air, so that the piston rod 5 moves ahead at a reduced speed controlled by the flow control valve 57.

A further forward movement of the piston 3 brings the rubber magnet 4 on the piston 3 to a position where it is sensed by the lead switch 10 which is set at the designated position where the piston rod 5 is to be stopped. As a result, the lead switch 10 produces an output signal which is delivered to the control circuit 63. Upon receipt of this signal, the control circuit 63 operates the solenoid Sol 2 of the three-way valve 55 to allow the port C to discharge the air. In consequence, the brake metal 14 of the piston rod brake section 11 grips and stops the piston rod 5. If no pneumatic pressure exists in the ports A and B, the speed control effect of the speed control valves 52,53 is nullified to allow the piston rod 5 to rush out when it is restarted. To avoid such a danger, the solenoids Sol 1 and Sol 1′ of the five-way valve 54 are operated to keep air pressure in both the ports A and B, after the piston rod 5 is stopped by the relief of air from the port C.

After lapse of a predetermined time from the stopping of the piston rod 5, the solenoid Sol 3 of the three-way valve 56 is operated to allow the supply of air through the port D. As a result, the deceleration brake metal 33 releases the piston rod 5 so that the deceleration brake cover 32 and the flow control piston rod 34 are allowed to move freely. On the other hand, the compressed air supplied through the three-way valve 56 acts also on the hydro-converter 58 so that the incompressible fluid 59 serves to increase the volume of the fluid chamber 44 communicating with the port E. In consequence, the flow control piston 42 and the deceleration brake cover 32 are moved in the direction counter to the arrow 60, so that the flow control pistons 42 and 43 are stopped at the positions shown in FIG. 2.

Figure 5:
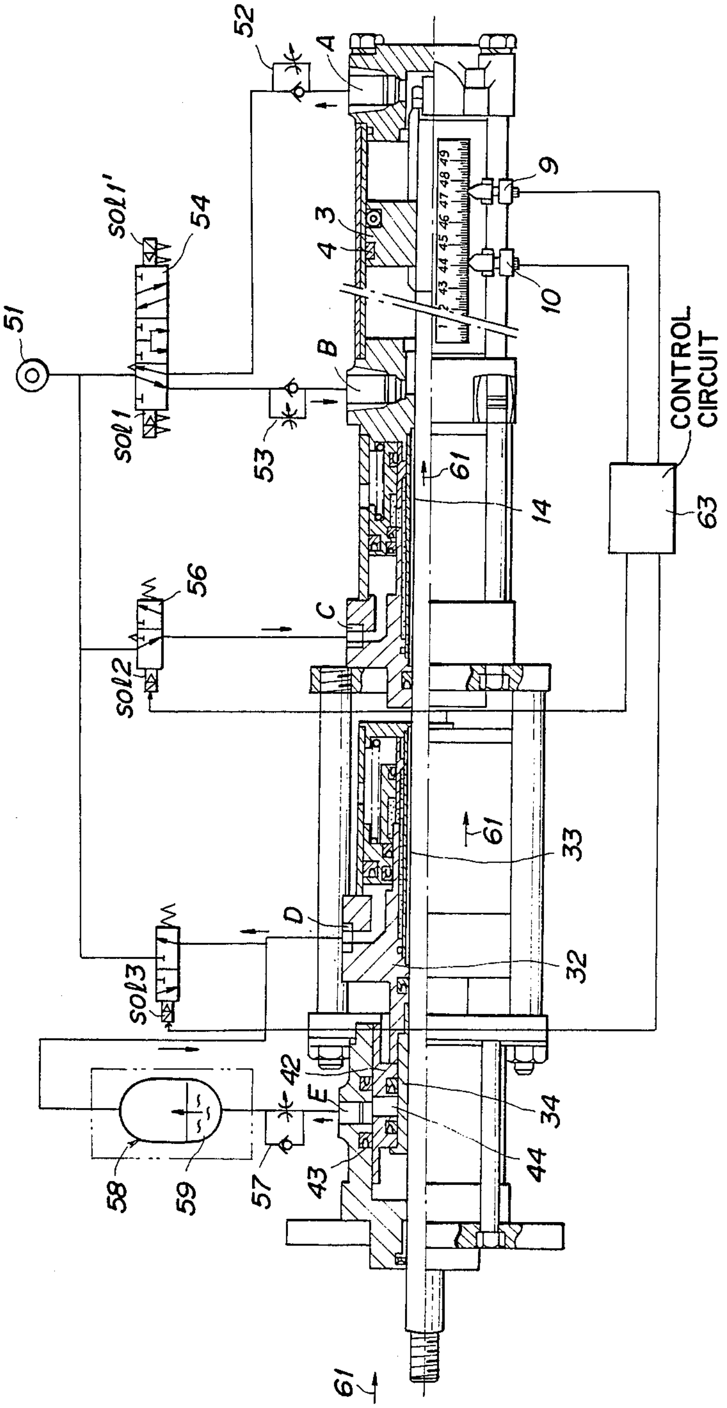

An explanation will be made hereinunder with reference to FIG. 5 as to the reversing, i.e., the driving in the direction counter to the arrow 60 in FIG. 2, of the piston rod 5. Since the port C has been charged with compressed air, the piston rod 5 is released from the gripping force which has been exerted by the brake metal 14. Then, the port A is opened to the atmosphere, while the port B is maintained under the pressure, so that the piston 3 starts to move in the direction of an arrow 61. The lead switch 10, which now serves as the sensor for detecting the arrival of the piston and the deceleration starting position, produces a signal upon detecting the magnetism of the magnet 4, such as to open the port D to the atmosphere. As a result, the deceleration brake cover 32, flow control piston rod 34 and the flow control piston 43 are retracted together with the piston rod 5 at the speed controlled by the flow control valve 57, in the same manner as that described before. Then, the magnetism of the rubber magnet 4 is sensed by the lead switch 9 which now serves as the sensor for detecting the arrival of the piston 3 at the stopping position, so that the port C is opened to the atmosphere thus stopping the piston rod 5 at an intermediate position. Thereafter, the piston rod 5 is held at this stopping position as both of the ports A and B are charged with compressed air. After a while, the port D is charged with compressed air so that the deceleration brake cover 32, flow control piston rod 34 and flow control pistons 42 and 43 are returned to their starting positions.

As has been described, according to the invention, it is possible to control both forward stroking and backward stroking of the piston in the same way. For instance, in the forward stroking of the piston rod 5, the designated stopping position is set by the lead switch 10, while the position at which the deceleration should be commenced is set by the lead switch 9 which is disposed to the rear of the lead switch 10 as viewed in the direction of movement of the piston rod 5. With this arrangement, the deceleration is started when the piston has reached the position of the lead switch 9 and is stopped at the position where the lead switch 10 is located. A high rate of deceleration of the piston rod 5 and, hence, a high precision of the stopping position control are attainable by restricting the flow of the air by the flow control valve 57.

In the embodiment described hereinbefore, a hydro-converter 58 is used as a means for decelerating the piston rod 5. The use of the hydro-converter, however, is not essential. Namely, if the inertia of the moving piston rod 5 is small, the hydro-converter 58 may be omitted. In such a case, the flow of air discharged from the flow control pistons 42 and 43 is restricted by the flow control valve 57, thus controlling the speed of the piston rod.

As has been described, according to the invention, the lead switches 9 and 10 capable of producing contact signals in response to the magnetism of the rubber magnet on the piston 3 are set at a predetermined deceleration starting position and a designated stopping position, and the signals from these lead switches are inputted to a control circuit 63 which is adapted to deliver driving signals to the solenoid valves Sol 2 and Sol 3, thereby suitably supplying and discharging compressed air from the ports C and D, and thus decelerating and stopping the piston rod 5 optimumly.

According to the invention, therefore, the precision of the stopping position control is improved and the piston rod can be stopped with minimal impact. Owing to these advantageous features, the present invention allows the pneumatic cylinder to operate at high speed and to be used for various purposes such as the driving of apparatus which require precise stopping of the piston rod at a position intermediate of its stroke.

In the embodiment described hereinbefore, lead switches 9 and 10 are used as the means for detecting the instant position of the piston rod, in cooperation with the rubber magnet 4 mounted on the piston 3. Obviously, this arrangement may be substituted by other equivalent systems.

Figure 6:
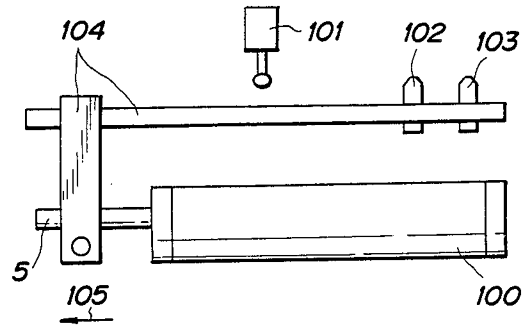
FIGS. 6 to 8 are schematic side elevational views of different examples of the piston rod position detecting mechanism.
Figure 7:
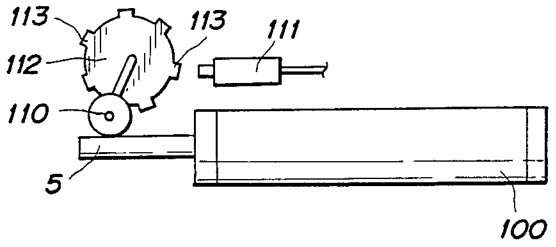
Figure 8:
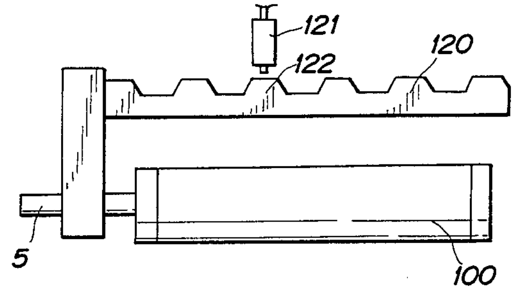

FIGS. 6, 7 and 8 show examples of position detecting systems which are usable in place of the combination of the lead switches and rubber magnet used in the described embodiment.

More specifically, FIG. 6 shows a position detecting system in which dogs 102 and 103 for cooperation with a stationary limit switch 101 are movably mounted on a support member 104 provided on the piston rod 5 of the pneumatic cylinder device 100. When the piston rod 105 moves in the direction of the arrow 105, the dog 102 set on the supporting member 104 first contacts with the limit switch 101 so that the latter produces a deceleration signal thus starting the deceleration of the piston rod 5 in the same way as the described embodiment. Then, the limit switch 101 is contacted by the dog 103 so that it produces a stopping signal thereby stopping the piston rod 5.

FIG. 7 shows another position detecting system having a motion converting mechanism 110 such as a rack-and-pinion type mechanism for converting the linear motion of the piston rod 5 into rotational motion, so that a pulse encoder 111 having a rotor 112 operatively connected to the motion converting mechanism 110 produces a signal corresponding to the travel of the piston rod 5. Namely, the pulse encoder 111 has a function for generating pulses corresponding to the number of teeth 113 on the rotor 112 counted in accordance with the direction of rotation of the rotor 112. Upon counting the number of pulses corresponding to a predetermined deceleration starting position, the pulse encoder 111 produces a deceleration signal thereby starting the deceleration of the piston rod 5. Then, when the pulse encoder has counted a predetermined number of pulses corresponding to the travel of the piston rod 5 to the stopping position, a stopping signal is produced thus stopping the piston rod at the desired stopping position.

FIG. 8 shows still another position detecting system in which a linearly movable member 120 having a plurality of teeth 122 is operatively connected to the piston rod 5. A pulse encoder 121 similar to that explained in connection with FIG. 7 produces a deceleration signal and a stopping signal upon counting the teeth 122 on the member 120 which moves linearly together with the piston rod 5.

It is to be noted also that the braking mechanism shown in FIG. 1 is only illustrative and the piston rod braking section can have any other suitable construction which can effectively hold and stop the piston rod 5, without impairing the advantages of the invention.

Although the invention has been described through specific terms, it is to be noted here that the described embodiment is only illustrative and various changes and modifications may be imparted thereto without departing from the scope of the invention which is limited solely by the appended claims.

What is claimed is:

1. A pneumatic cylinder device having a deceleration mechanism comprising:

a pneumatic cylinder assembly including a cylinder accommodating a piston movable in said cylinder assembly and having a piston rod connected to said piston;

a position detecting means operatively associated with said piston rod for producing a signal when said piston rod has reached a predetermined position; and a braking mechanism operatively connected to said pneumatic cylinder assembly for decelerating and stopping the movement of said piston rod in response to the signal from said position detecting means;

said braking mechanism comprising a braking means operatively connected to said pneumatic cylinder assembly for stopping the movement of said piston rod, a deceleration means operatively connected to said braking means for decelerating said piston rod, a deceleration adjusting means connected to said deceleration means, means for operating said deceleration means to start the deceleration of the movement of said piston rod in response to a deceleration signal generated by said position detecting means when said piston rod reaches a predetermined deceleration starting position and means for operating said braking means to stop the movement of the decelerated piston rod in response to a stopping signal generated by said position detecting means when said piston rod reaches a designated stopping position, the decelerating rate of said deceleration means being adjusted by said deceleration adjusting means, and said deceleration adjusting means including flow control pistons actuable via a deceleration brake cover which is selectively coupled to said piston rod responsive to said deceleration signal generated by said position detecting means, said flow control pistons displacing a fluid from a fluid chamber when said deceleration brake cover is coupled to said piston rod, said fluid chamber having a port connected to a flow control valve for adjusting the deceleration rate.

2. A pneumatic cylinder device having a deceleration mechanism as set forth in claim 1, wherein said braking means comprises:

a booster tube having an internal bore;

a brake metal accommodated in said booster tube and having a longitudinally extending slit, said brake metal slidably receiving said piston rod;

a flexible thin-walled bush fitted around said brake metal;

a sleeve disposed in said booster tube so as to surround said bush and having a large diameter portion and a small diameter portion with a step defined therebetween;

a first pressure chamber defined between said sleeve and said bush;

a piston chamber defined between said booster tube and said sleeve;

a booster piston received in said piston chamber and having a large piston slidably along the large-diameter portion of said sleeve and a small piston slidable along the small-diameter portion of said sleeve, said booster piston dividing said piston chamber into a spring chamber and a brake releasing chamber;

a spring means in said spring chamber for urging said booster piston toward said brake releasing chamber; and a second pressure chamber formed between said sleeve and said booster piston and being in fluid communication with said first pressure chamber through a communication hole formed in said sleeve, said communication hole extending normally to the outer periphery of said small-diameter portion of said sleeve in the vicinity of said step defined between said large and small diameter portions thereof.

3. A pneumatic cylinder device with a deceleration mechanism as set forth in claim 1, wherein said position detecting means includes a magnet provided on said piston, and proximity switches movably arranged along a scale plate which is disposed along said cylinder and having a scale indicative of the travel of said piston rod.

4. A pneumatic cylinder device with a deceleration mechanism as set forth in claim 1, wherein said position detecting means includes a plurality of dogs attached to a supporting member designed for movement together with said piston rod, and a limit switch adapted to be operated by said dogs when said piston has reached a predetermined deceleration starting position and a predetermined stopping position, respectively.

5. A pneumatic cylinder device with a deceleration mechanism as set forth in claim 1, wherein said position detecting means includes a motion converting mechanism for converting the linear motion derived from the movement of said piston rod into a rotational motion, a rotor having a plurality of teeth on the outer periphery thereof and operatively connected to said motion converting mechanism such as to rotate over an angle corresponding to the travel of said piston rod, and a pulse encoder adapted for detecting the amount of rotation of said rotor and for producing a deceleration signal and a stopping signal when said piston rod has reached a predetermined deceleration starting position and a predetermined stopping position.

6. A pneumatic cylinder device with a deceleration mechanism as set forth in claim 1, wherein said position detecting means includes a linearly movable member adapted for movement together with said piston rod and having a plurality of teeth arranged in a row at a predetermined pitch, and a pulse encoder adapted for detecting the travel of said linearly movable member and for producing a deceleration starting signal and a stopping signal when said piston rod has reached a predetermined deceleration starting position and a predetermined stopping position, respectively.

7. The pneumatic cylinder device according to claim 1 further including:

means for selectively supplying fluid to said deceleration means to prevent deceleration of said piston rod and for selectively discharging fluid from said deceleration means to cause deceleration of said piston rod; and means for selectively supplying fluid to said braking means to prevent braking of said piston rod and for selectively discharging fluid from said braking means to cause stopping of said piston rod.

8. The pneumatic cylinder device according to claim 7 wherein said means for selectively supplying fluid to and selectively discharging fluid from said deceleration means and said means for selectively supplying fluid to and selectively discharging fluid from said braking means are controlled by a controlling means operatively connected to said position detecting means.

* * * * *